(12) United States Patent
Kim et al.

(10) Patent No.: US 10,397,837 B2
(45) Date of Patent: Aug. 27, 2019

(54) METHOD AND DEVICE FOR PERFORMING SESSION HANDOVER IN WIRELESS COMMUNICATION SYSTEM

(71) Applicant: LG ELECTRONICS INC., Seoul (KR)

(72) Inventors: Dongcheol Kim, Seoul (KR); Byungjoo Lee, Seoul (KR); Hyunhee Park, Seoul (KR); Giwon Park, Seoul (KR); Taesung Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/575,649

(22) PCT Filed: May 20, 2016

(86) PCT No.: PCT/KR2016/005361
§ 371 (c)(1),
(2) Date: Nov. 20, 2017

(87) PCT Pub. No.: WO2016/190618
PCT Pub. Date: Dec. 1, 2016

(65) Prior Publication Data
US 2018/0359664 A1 Dec. 13, 2018

Related U.S. Application Data

(60) Provisional application No. 62/165,202, filed on May 22, 2015.

(51) Int. Cl.
*H04L 7/00* (2006.01)
*H04W 36/00* (2009.01)
(Continued)

(52) U.S. Cl.
CPC ....... *H04W 36/0066* (2013.01); *H04W 36/00* (2013.01); *H04W 36/0016* (2013.01);
(Continued)

(58) Field of Classification Search
CPC ......... H04W 36/0011; H04W 36/0016; H04W 36/0027; H04W 36/22
(Continued)

(56) References Cited

U.S. PATENT DOCUMENTS 7,734,292 B2 * 6/2010 Cho ..................... H04W 88/02
455/436
8,825,767 B2 * 9/2014 Sivavakeesar ...... H04L 12/1818
709/205
(Continued)

FOREIGN PATENT DOCUMENTS

KR 1020050101692 A 10/2005
KR 1020130088898 A 8/2013
(Continued)

OTHER PUBLICATIONS

Wi-Fi certified Wi-Fi Direct, Wi-Fi Alliance, Sep. 2014, pp. 1-18.*

*Primary Examiner* — Dmitry Levitan
(74) *Attorney, Agent, or Firm* — Dentons US LLP

(57) ABSTRACT

The present specification relates to a method by which a first terminal performs a session handover in a wireless communication system, wherein the method for performing a session handover can comprise the steps of: forming an ASP session with a second terminal by a first connecting method; transmitting a session handover request to the second terminal; receiving a session handover response from the second terminal; and transmitting a session handover confirm to the second terminal, wherein, when the session handover response is received from the second terminal, the formed ASP session can be handed over by a second connecting method.

12 Claims, 13 Drawing Sheets

(51) Int. Cl.
*H04W 88/06* (2009.01)
*H04W 76/14* (2018.01)

(52) U.S. Cl.
CPC ... *H04W 36/0022* (2013.01); *H04W 36/0079* (2018.08); *H04W 76/14* (2018.02); *H04W 88/06* (2013.01)

(58) Field of Classification Search
USPC .......................... 370/310, 331–333, 349, 389
See application file for complete search history.

(56) References Cited

U.S. PATENT DOCUMENTS

| | | | | |
|---|---|---|---|---|
| 9,037,763 | B2 * | 5/2015 | Huang | G06F 13/385 710/63 |
| 9,356,804 | B1 * | 5/2016 | Passaglia | H04L 12/5692 |
| 9,531,764 | B1 * | 12/2016 | McHugh | H04L 67/142 |
| 2013/0102314 | A1 | 4/2013 | Koskela et al. | |
| 2014/0003237 | A1 * | 1/2014 | Kenney | H04W 28/10 370/235 |
| 2014/0196125 | A1 * | 7/2014 | Huang | G06F 1/1632 726/5 |
| 2015/0257166 | A1 * | 9/2015 | Weizman | H04W 40/12 455/452.2 |
| 2016/0142581 | A1 * | 5/2016 | Morita | H04W 4/80 358/1.13 |
| 2016/0150465 | A1 * | 5/2016 | Jung | H04W 48/16 370/254 |

FOREIGN PATENT DOCUMENTS

| | | |
|---|---|---|
| KR | 1020140114824 A | 9/2014 |
| WO | 2015003153 A1 | 1/2015 |

\* cited by examiner

--Prior Art--

First WFD device (cellular phone)  Second WFD device (display device)

*ASP of a first device*

(a)

METHOD AND DEVICE FOR PERFORMING SESSION HANDOVER IN WIRELESS COMMUNICATION SYSTEM

This application is a 35 USC § 371 National Stage entry of International Application No. PCT/KR2016/005361 filed on May 20, 2016, and claims priority to U.S. Provisional Application No. 62/165,202 filed on May 22, 2015, all of which are hereby incorporated by reference in their entireties as if fully set forth herein.

TECHNICAL FIELD

The specification relates to a wireless communication system and, more specifically, to a method and a device for performing session handover in a wireless communication system

BACKGROUND ART

Wireless access systems have been widely deployed to provide various types of communication services such as voice or data. In general, a wireless access system is a multiple access system that may support communication of multiple users by sharing available system resources (e.g., a bandwidth, transmission power, etc.). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a multi carrier frequency division multiple access (MC-FDMA) system.

Recently, various wireless communication technologies have been developed with the advancement of information communication technology. Among the wireless communication technologies, a wireless local area network (WLAN) is the technology capable of accessing the Internet by wireless in a home, a company or a specific service provided area through portable device such as a personal digital assistant (PDA), a laptop computer, a portable multimedia player (PMP), etc. based on a radio frequency technology.

A standard for a WLAN (wireless local area network) technology is developing by IEEE (institute of electrical and electronics engineers) 802.11 group. IEEE 802.11a and b use an unlicensed band on 2.4 GHz or 5 GHz, IEEE 802.11b provides transmission speed of 11 Mbps and IEEE 802.11a provides transmission speed of 54 Mbps. IEEE 802.11g provides transmission speed of 54 Mbps by applying 01-DM (orthogonal frequency division multiplexing) on 2.4 GHz. IEEE 802.11n provides transmission speed of 300 Mbps by applying MIMO-OFDM (multiple input multiple output-orthogonal frequency division multiplexing). IEEE 802.11n supports a channel bandwidth up to 40 MHz. In this case, transmission speed can be provided as fast as 600 Mbps. IEEE 802.11p corresponds to a standard for supporting WAVE (wireless access in vehicular environments). For instance, 802.11p provides improvement necessary for supporting ITS (intelligent transportation systems). IEEE 802.11ai corresponds to a standard for supporting fast initial link setup of IEEE 802.11 station.

A DLS (direct link setup)-related protocol in wireless LAN environment according to IEEE 802.11e is used on the premise of a QBSS (quality BSS) supporting QoS (quality of service) supported by a BSS (basic service set). In the QBSS, not only a non-AP STA but also an AP corresponds to a QAP (quality AP) supporting QoS. Yet, in current commercialized wireless LAN environment (e.g., wireless LAN environment according to IEEE 802.11a/b/g etc.), although a non-AP STA corresponds to a QSTA (quality STA) supporting QoS, most of APs corresponds to a legacy AP incapable of supporting QoS. Consequently, in the current commercialized wireless LAN environment, there is a limit in that a QSTA is unable to use a DLS service.

In a recent situation that such a wireless short-range communication technology as Wi-Fi and the like is widely applied to a market, connection between devices is performed not only based on a local network but also based on direct connection between devices. One of technologies enabling devices to be directly connected is Wi-Fi Direct.

Wi-Fi Direct corresponds to a network connectivity standard technology describing up to operations of a link layer. Since there is no definition on a regulation or a standard for an application of a higher layer, it is difficult to have compatibility and consistency of an operation after Wi-Fi Direct devices are connected with each other. For this reason, such a standard technology including higher layer application technology as WFDS (Wi-Fi Direct service) is under discussion by WFA (Wi-Fi alliance).

The WFA has announced such a new standard for delivering data via a direct connection between mobile devices as Wi-Fi Direct. Hence, related industries are actively developing a technology for satisfying the Wi-Fi Direct standard. In a strict sense, the Wi-Fi Direct is a marketing terminology and corresponds to a brand name. A technology standard for the Wi-Fi Direct is commonly called Wi-Fi P2P (peer to peer). Hence, the present invention describing Wi-Fi-based P2P technology may be able to use Wi-Fi Direct and Wi-Fi P2P without any distinction. In a legacy Wi-Fi network, a user accesses the legacy Wi-Fi network via an AP (access point) and accesses the Internet to use a device on which Wi-Fi is mounted. A data communication method via direct connection between devices is also used in a legacy communication by some users in a manner of being mounted on a device (e.g., a cellular phone, a note PC, etc.) on which a wireless communication technology such as Bluetooth is mounted. Yet, according to the data communication method, transmission speed is slow and transmission distance is limited to within 10 m. In particular, when the data communication method is used for transmitting massive data or is used in environment at which many Bluetooth devices exist, there exists a technical limit in performance capable of being felt by a user.

Meanwhile, Wi-Fi P2P maintains most of functions of the legacy Wi-Fi standard and includes an additional part for supporting direct communication between devices. Hence, the Wi-Fi P2P can sufficiently utilize hardware and physical characteristics of a device on which a Wi-Fi chip is mounted and is able to provide device-to-device P2P communication by upgrading a software function only.

As widely known, the device on which the Wi-Fi chip is mounted is extending to various ranges including a note PC, a smartphone, a smart TV, a game console, a camera and the like. For the device, sufficient numbers of suppliers and technology development personnel have been formed. Yet, software development supporting the Wi-Fi P2P standard is not vitalized yet. This is because, although a Wi-Fi P2P standard is announced, related software capable of conveniently using the Wi-Fi P2P standard is not distributed.

There exists a device playing a role of an AP in a legacy infrastructure network in a P2P group. The device is called a P2P group owner (GO) in a P2P standard. Various P2P clients may exist on the basis of the P2P GO. One GO exists in a single P2P group only and all remaining devices become client devices.

Recently, the use of Bluetooth, NAN (neighboring awareness networking), and NFC (near field communication) is increasing. Hence, it is necessary to have a method of providing a service in environment in which a plurality of systems or interfaces are provided.

DISCLOSURE

Technical Problem

The specification relates to a method and a device for performing session handover in a wireless communication system.

The specification relates to a method and a device for performing handover of a session generated on the basis of an application service platform (ASP) supporting multiple interfaces.

The specification relates to a method and a device for configuring information about messages exchanged during a session handover process in a wireless communication system.

Technical Solution

According to an embodiment of the present invention, there is provided a method for performing session handover by a first device in a wireless communication system. The method for performing session handover includes: establishing an application service platform (ASP) session with a second device through a first connection method; transmitting a session handover request to the second device; receiving a session handover response from the second device; and transmitting a session handover confirm to the second device, wherein the established ASP session is handed over through a second connection method when the session handover response is received from the second device.

According to another embodiment of the present invention, there is provided a first device performing session handover in a wireless communication system. The first device includes: a reception module for receiving information from an external device; a transmission module for transmitting information to the external device; and a processor for controlling the reception module and the transmission module, wherein the processor is configured: to establish an application service platform (ASP) session with a second device through a first connection method; to transmit a session handover request to the second device using the transmission module; to receive a session handover response from the second device using the reception module; and to transmit a session handover confirm to the second device using the transmission module, wherein the established ASP session is handed over through a second connection method when the session handover response is received from the second device.

The following can be commonly applied to a method and a device for performing session handover in a wireless communication system.

According to an embodiment of the present invention, the session handover request may include information about the established ASP session and information about services supported on the basis of the established ASP session.

Here, the session handover request may further include information about the second connection method according to an embodiment of the present invention.

According to an embodiment of the present invention, the session handover response may include information indicating whether handover from the first connection method to the second connection method is possible.

Here, the session handover response may further include information about the second connection method when the information indicates that handover is possible according to an embodiment of the present invention.

According to an embodiment of the present invention, when the information indicates that handover is impossible, the session handover response may further include information about the reason for impossible handover.

According to an embodiment of the present invention, the session handover request and the session handover response may be exchanged on the basis of the first connection method, and the session handover confirm may be transmitted on the basis of the second connection method.

According to an embodiment of the present invention, the ASP session may be established on the basis of one of the first connection method and the second connection method when the ASP session is established on the basis of an ASP.

According to an embodiment of the present invention, each of the first connection method and the second connection method may be one of a P2P (peer to peer) connection method and a WLAN infrastructure connection method.

According to an embodiment of the present invention, the method may further include performing connection through the second connection method after reception of the session handover response from the second device.

Here, when connection is performed through the second connection method, the first device and the second device may exchange information about the connection, the information about the connection including information indicating that the connection is performed for the session handover according to an embodiment of the present invention.

According to an embodiment of the present invention, the session handover request, the session handover response and the session handover confirm may be ASP coordination protocol (CP) messages.

According to an embodiment of the present invention, the ASP CP messages may be exchanged on the basis of the established ASP session.

Advantageous Effects

The specification can provide a method and a device for performing session handover in a wireless communication system.

The specification can provide a method and a device for performing handover of a session generated on the basis of an application service platform supporting multiple interfaces.

The specification can provide a method and a device for configuring information about messages exchanged during a session handover process in a wireless communication system.

The effects that can be achieved with the present invention are not limited to what has been particularly described hereinabove and can be inferred from embodiments of the present invention.

BEST MODE

Figure 1:
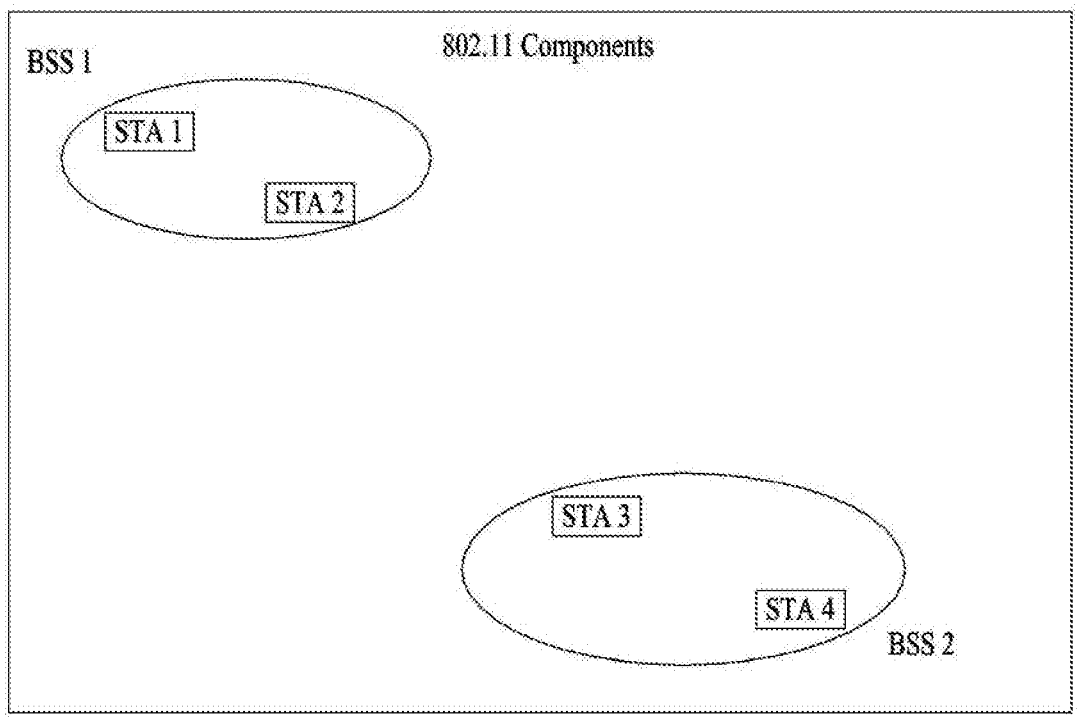
FIG. 1 illustrates a structure of an IEEE 802.11 system to which the present invention can be applied.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide the full understanding of the present invention. However, it will be apparent to those skilled in the art that the present invention may be implemented without such specific details.

The following embodiments can be achieved by combinations of structural elements and features of the present invention in prescribed forms. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

Specific terminologies in the following description are provided to help the understanding of the present invention. And, these specific terminologies may be changed to other formats within the technical scope or spirit of the present invention.

Occasionally, to avoid obscuring the concept of the present invention, structures and/or devices known to the public may be skipped or represented as block diagrams centering on the core functions of the structures and/or devices. In addition, the same reference numbers will be used throughout the drawings to refer to the same or like parts in this specification.

The embodiments of the present invention can be supported by the disclosed standard documents disclosed for at least one of wireless access systems including IEEE 802 system, 3GPP system, 3GPP LTE system, LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document can be supported by the above standard documents.

The following embodiments of the present invention can be applied to a variety of wireless access technologies, for example, CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc.

Although the terms such as "first" and/or "second" in this specification may be used to describe various elements, it is to be understood that the elements are not limited by such terms. The terms may be used to identify one element from another element. For example, a first element may be referred to as a second element, and vice versa within the range that does not depart from the scope of the present invention.

In the specification, when a part "comprises" or "includes" an element, it means that the part further comprises or includes another element unless otherwise mentioned. Also, the terms " . . . unit", " . . . module" disclosed in the specification means a unit for processing at least one function or operation, and may be implemented by hardware, software or combination of hardware and software.

For clarity, the following description focuses on IEEE 802.11 systems. However, technical features of the present invention are not limited thereto.

FIG. 1 is a diagram for an example of a structure of IEEE 802.11 system to which the present invention is applicable.

IEEE 802.11 structure can consist of a plurality of configuration elements and a WLAN supporting mobility of an STA, which is transparent to an upper layer, can be provided by interaction of a plurality of the configuration elements. A basic service set (hereinafter abbreviated BSS) may correspond to a basic configuration block in IEEE 802.11 LAN. FIG. 1 shows an example that there exist two BSSs (BSS 1 and BSS 2) and two STAs are included in each of the BSSs as members, respectively (STA 1 and STA 2 are included in the BSS 1 and STA 3 and STA 4 are included in the BSS 2). In this case, an STA indicates a device operating according to MAC (medium access control)/PHY (physical) standard of IEEE 802.11. An STA includes an AP (access point) STA (simply, an AP) and a non-AP STA. An AP corresponds to a device providing network access (e.g., WLAN) to a non-AP STA via a wireless interface. The AP can be configured by a fixed form or a mobile form and includes a mobile wireless device (e.g., a laptop computer, a smartphone, etc.) providing a hot-spot. The AP corresponds to a base station (BS), a Node-B, an evolved Node-B (eNB), a base transceiver system (BTS), a femto BS and the like in a different wireless communication field. The non-AP STA corresponds to a device directly controlled by a user such as a laptop computer, a PDA, a wireless modem, a smartphone and the like. The non-AP STA can be called a device, a wireless transmit/receive unit (WTRU), a user equipment (UE), a mobile station (MS), a mobile device, a mobile subscriber station (MSS), and the like.

An oval indicating a BSS in FIG. 1 may be comprehended as a coverage area of the STAs included in the BSS to maintain a communication. This area can be called a basic service area (hereinafter abbreviated BSA). A BSS of a most basic type in IEEE 802.11 LAN may correspond to an independent BSS (hereinafter abbreviated IBSS). For instance, the IBSS may have a minimum form consisting of two STAs only. The BSS (BSS 1 or BSS 2), which is the simplest form and omitted different configuration elements, in FIG. 1 may correspond to a representative example of the IBSS. This sort of configuration is available when the STAs are able to directly communicate with each other. And, this kind of LAN can be configured when a LAN is necessary instead of being configured in advance. Hence, this network may be called an ad-hoc network.

When power of an STA is turned on or turned off or an STA enters into a BSS area or gets out of the BSS area, a membership of the STA in a BSS can be dynamically changed. In order to be a member of the BSS, the STA can join the BSS using a synchronization process. In order to access all services based on a BSS structure, the STA can be associated with the BSS.

Figure 2:
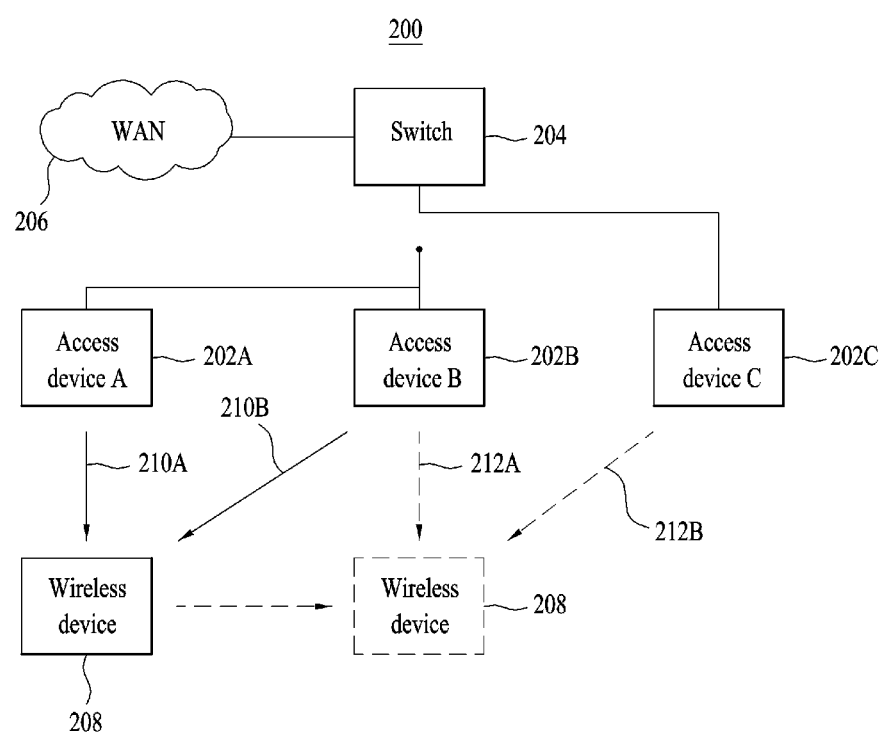
FIG. 2 is a block diagram illustrating an exemplary operation of a communication system employing access devices and wireless devices.

FIG. 2 is a block diagram for an example of a communication system 200 adopting access devices (e.g., AP STAs) 220A/202B/202C and wireless user devices (e.g., non-AP STAs).

Referring to FIG. 2, access devices 202A to 202C are connected with a switch 204 providing access to a WAN (wide area network) 206 such as the Internet. Each of the access devices 202A to 202C provides wireless access to wireless devices belonging to a coverage area (not depicted) of the access device via a time division multiplexed network. Hence, the access devices 202A to 202C commonly provide a total WLAN coverage area of the system 200. For instance, a wireless device 208 may exist in a coverage area of the access devices 202A and 202B in a position represented by a box of a line. Hence, the wireless device 208 can receive beacons from each of the access devices 202A/202B as shown by line arrows 210A and 210B. If the wireless device 208 roams to a dotted line box from the line box, the wireless device 208 enters a coverage area of the access device 202C and leaves a coverage area of the access device 202A. Hence, as shown by dotted lines 212A and 212B, the wireless device 208 can receive beacons from the access devices 202B/202C.

When the wireless device 208 roams in the total WLAN coverage area provided by the system 200, the wireless device 208 can determine which device provides best access to the wireless device 208. For instance, the wireless device 208 repeatedly scans beacons of adjacent access devices and may be able to measure signal strength (e.g., power) related to each of the beacons. Hence, the wireless device 208 can be connected with an access device providing optimal network access based on maximum beacon signal strength. The wireless device 208 may be able to use a different reference related to optimal access. For instance, the optimal access may be associated with more preferable services (e.g., contents, data rate and the like).

Figure 3:
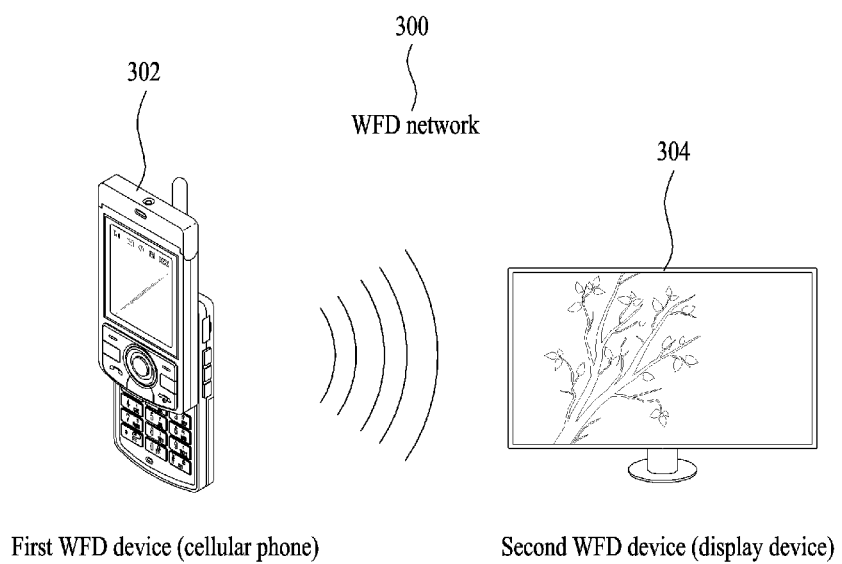
FIG. 3 illustrates a Wi-Fi Direct (WFD) network.

FIG. 3 is a diagram for an example of a WFD (Wi-Fi Direct) network.

A WFD network corresponds to a network capable of performing D2D (device-to-device) (or peer to peer (P2P)) communication although Wi-Fi devices do not participate in a home network, an office network or a hot-spot network. The WFD network is proposed by Wi-Fi alliance. In the following, WFD-based communication is called WFD D2D communication (simply, D2D communication) or WFD P2P communication (simply, P2P communication). And, a device performing the WFD P2P communication is called a WFD P2P device, simply, a P2P device.

Referring to FIG. 3, a WFD network 300 can include at least one or more Wi-Fi devices including a first WFD device 302 and a second WFD device 304. A WFD device includes devices supporting Wi-Fi such as a display device, a printer, a digital camera, a projector, a smartphone and the like. And, the WFD device includes a non-AP STA and an AP STA. Referring to an example shown in the drawing, the first WFD device 302 corresponds to a smartphone and the second WFD device 304 corresponds to a display device. WFD devices in the WFD network can be directly connected with each other. Specifically, P2P communication may correspond to a case that a signal transmission path between two WFD devices is directly configured between the WFD devices without passing through a third device (e.g., an AP) or a legacy network (e.g., access WLAN via an AP). In this case, the signal transmission path directly configured between the two WFD devices may be restricted to a data transmission path. For instance, P2P communication may correspond to a case that a plurality of non-STAs transmit data (e.g., audio/image/text message information etc.) without passing through an AP. A signal transmission path for control information (e.g., resource allocation information for P2P configuration, wireless device identification information and the like) can be directly configured between WFD devices (e.g., between a non-AP STA and a non-AP STA, between a non-AP STA and an AP), between two WFD devices (e.g., between a non-AP STA and a non-AP STA) via an AP or between an AP and a corresponding WFD device (e.g., an AP and a non-AP STA #1, between an AP and a non-AP STA #2).

Figure 4:
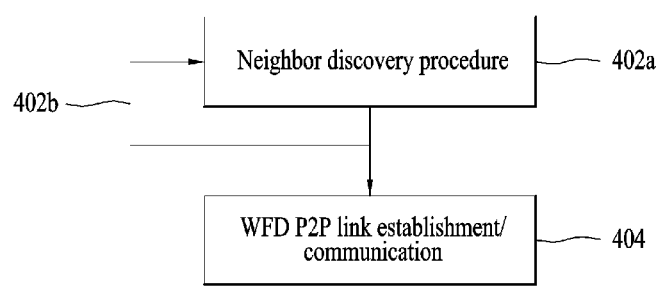
FIG. 4 illustrates a process of constructing a WFD network

FIG. 4 is a flowchart for an example of a procedure of configuring a WFD network.

Referring to FIG. 4, a procedure of configuring a WFD network can be mainly divided into two procedures. A first procedure corresponds to a neighbor (device) discovery (ND) procedure [S402a] and a second procedure corresponds to a P2P link configuration and communication procedure [S404]. A WFD device (e.g., 302 in FIG. 3) finds out a different neighboring device (e.g., 304 in FIG. 3) in coverage (of the WFD device) via the neighbor discovery procedure and may be able to obtain information necessary for associating with the neighboring WFD device, e.g., information necessary for pre-association. In this case, the pre-association may indicate second layer pre-association in a wireless protocol. The information necessary for the pre-association can include identification information on the neighboring WFD device for example. The neighbor discovery procedure can be performed according to an available radio channel [S402b]. Subsequently, the WFD device 302 can perform a WFD P2P link configuration/communication procedure with the different WFD device 304. For instance, the WFD device 302 can determine whether the WFD device 304 corresponds to a WFD device not satisfying a service requirement of a user after the WFD device 302 is connected with the neighboring WFD device 304. To this end, the WFD device 302 is second layer pre-associated with the neighboring WFD device 304 and may be then able to search for the WFD device 304. If the WFD device 304 does not satisfy the service requirement of the user, the WFD device 302 disconnects the second layer connection established with the WFD device 304 and may be able to establish the second layer connection with a different WFD device. On the contrary, if the WFD device 304 satisfies the service requirement of the user, the two WFD devices 302/304 can transceive a signal with each other via a P2P link.

Figure 5:
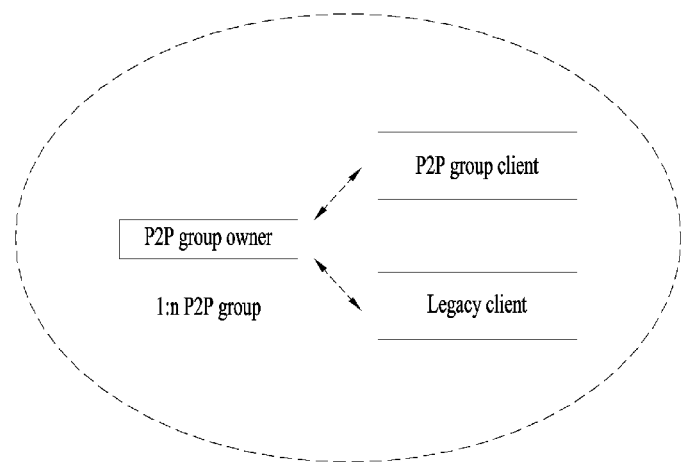
FIG. 5 illustrates a typical P2P network topology.

FIG. 5 is a diagram for a typical P2P network topology.

As shown in FIG. 5, a P2P GO can be directly connected with a client including a P2P function. Or, the P2P GO can be connected with a legacy client, which has no P2P function.

Figure 6:
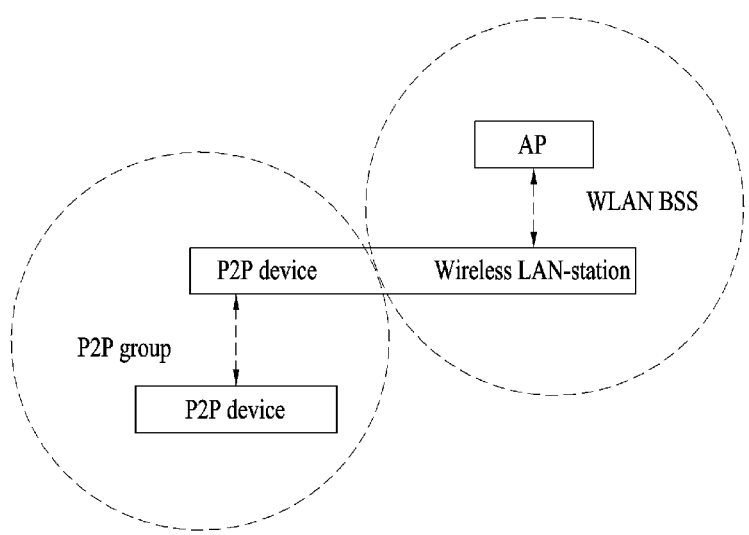
FIG. 6 illustrates a situation in which one P2P device forms a P2P group and, simultaneously, operates as an STA of a WLAN to be connected to an AP.

FIG. 6 is a diagram for a situation that a single P2P device forms a P2P group and is connected with an AP in a manner of operating as an STA of WLAN at the same time.

As shown in FIG. 6, according to P2P technical standard, a situation that a P2P device operates in the aforementioned mode is defined as a concurrent operation.

In order for a series of P2P devices to form a group, a P2P GO is determined based on a group owner intent value of a P2P attribute ID. The group owner intent value may have a value ranging from 0 to 15. P2P devices are exchanging the values and a P2P device including a highest value becomes the P2P GO. Meanwhile, in case of a legacy device not supporting the Wi-Fi P2P technology, although the legacy device can belong to a P2P group, a function of the legacy device is limited to a function of accessing an infrastructure network via the P2P GO.

According to Wi-Fi P2P standard, since a P2P GO transmits a beacon signal using OFDM (orthogonal frequency division multiplexing), a P2P device does not support 11b standard. Instead, 11a/g/n can be used as Wi-Fi P2P device.

In order to perform an operation of connecting a P2P GO and a P2P client with each other, a P2P standard mainly includes 4 functions described in the following.

First of all, P2P discovery is dealing with such a description entry as device discovery, service discovery, group formation and P2P invitation. According to the device discovery, 2 P2P devices exchange device-related information such as a device name of a counterpart device or a device type with each other via an identical channel According to the service discovery, a service to be used and service-related information are exchanged with each other via P2P. According to the group formation, it corresponds to a function that a device to be a P2P GO is determined and a new group is formed. According to the P2P invitation, it corresponds to a function that a permanently formed P2P group is summoned or a function of making a P2P device join a legacy P2P group.

Secondly, P2P group operation explains P2P group formation and termination, connection to a P2P group, communication in a P2P group, a service for P2P client discovery, operation of a persistent P2P group and the like.

Thirdly, P2P power management is dealing with a method of managing power of a P2P device and a method of processing a signal on power saving mode timing.

Lastly, managed P2P device is dealing with a method of forming a P2P group in a single P2P device and a method of accessing an infrastructure network via a WLAN AP at the same time.

Characteristics of a P2P group are explained in the following. A P2P group is similar to a legacy infrastructure BSS (basic service set) in that a P2P GO plays a role of an AP and a P2P client plays a role of an STA. Hence, software capable of performing a role of a GO and a role of a client should be mounted on a P2P device. The P2P device is distinguished by using a P2P device address such as a MAC address. Yet, when the P2P device performs communication in a P2P group, the P2P device uses a P2P interface address. In this case, it is not necessary for the P2P device to use a single identifier (a globally unique ID) address. The P2P group includes a single identifier P2P group ID. The single identifier P2P group ID consists of a combination of an SSID (service set identifier) and a P2P device address. Wi-Fi P2P standard uses WPA2-PSK/AES for security. A life cycle of a P2P group has a temporary connection method and a persistent connection method for attempting an identical connection after prescribed time. In case of a persistent group, once a P2P group is formed, a role, a certificate, an SSID and a P2P group ID are cached. When connection is reestablished, connection of a group can be promptly established by applying an identical connection form.

In the following, Wi-Fi P2P connection method is explained. A Wi-Fi device mainly performs a connection procedure of two phases. First one corresponds to a phase that two P2P devices find out a counterpart device and a second one corresponds to a group formation phase for determining a role of a P2P GO or a role of a P2P client between discovered devices. First of all, the finding phase corresponds to a phase of connecting P2P devices with each other. In particular, the finding phase includes a search state and a listen state. The search state performs active search using a probe request frame. In this case, a range of the search is restricted for a quick search. For the quick search, such a social channel as a channel 1, 6 and 11 are used. A P2P device of the listen state maintains a reception state in a manner of selecting one channel from the 3 social channels. If the P2P device receives a probe request frame transmitted by a different P2P device of the search state, the P2P device transmits a probe response frame to the different P2P device in response to the probe request frame. P2P devices continuously repeat the search state and the listen state and may be able to arrive at a channel common to the P2P devices. The P2P devices find out a counterpart device and use a probe request frame and a probe response frame to selectively combine with the counterpart device and to discover a device type, a manufacturer, or a friendly device name. In order to check a service existing in the internal of the P2P devices and compatible between the devices, it may use the service discovery. The service discovery is used to determine whether a service provided in the internal of each device is compatible with a different device. According to the P2P standard, a specific service discovery standard is not designated. A user of a P2P device searches for a neighboring P2P device and a service provided by the P2P device and may be then able to connect with a device or a service preferred by the user.

As a second phase, a group formation phase is explained in the following. If a P2P device completes the aforementioned find phase, checking existence of a counterpart device is completed. Based on this, two P2P devices should enter a GO negotiation phase to configure a BSS. The negotiation phase is divided into two sub phases. One is a GO negotiation phase and another is a WPS (Wi-Fi protected setup) phase. In the GO negotiation phase, the two P2P devices negotiate a role of a P2P GO and a role of a P2P client with each other and an operation channel to be used in the internal of a P2P group is configured. In the WPS phase, such a usual job performed in a legacy WPS as exchanging PIN information inputted by a user using a keypad or the like, simple setup via a push button and the like is performed. In a P2P group, a P2P GO plays core role of the P2P group. The P2P GO assigns a P2P interface address, selects an operation channel of the group and transmits a beacon signal including various operation parameters of the group. In the P2P group, a beacon signal can be transmitted by the P2P GO only. A P2P device can quickly check the P2P GO using the beacon signal in a scan phase corresponding to a connection initial phase and performs a role of participating in the group. Or, the P2P GO can initiate a P2P group session by itself or may be able to initiate a session after the method mentioned earlier in the P2P finding phase is performed. Hence, since a value intended to be the P2P GO is controlled by an application or a higher layer service instead of a value fixed by a certain device, a developer can select an appropriate value, which is intended to be the P2P GO, according to a usage of each application program.

Subsequently, P2P addressing is explained in the following. A P2P device uses a P2P interface address in a manner of assigning a P2P interface address using a MAC address in a P2P group session. In this case, the P2P interface address of a P2P GO corresponds to a BSSID (BSS identifier). The BSSID practically corresponds to a MAC address of the P2P GO.

Connection release of a P2P group is explained in the following. If a P2P session is terminated, a P2P GO should inform all P2P clients of termination of a P2P group session via De-authentication. A P2P client can also inform the P2P GO of connection release. In this case, if possible, it is necessary to perform a disassociation procedure. Having received a connection release request of a client, the P2P GO can identify that connection of the P2P client is released. If the P2P GO detects a P2P client making a protocol error or performing an operation of interrupting connection of a P2P group, the P2P GO generates rejection of authentication or a denial of association. In this case, the P2P GO records a concrete failure reason on an association response and transmits the association response to the P2P client.

Figure 7:
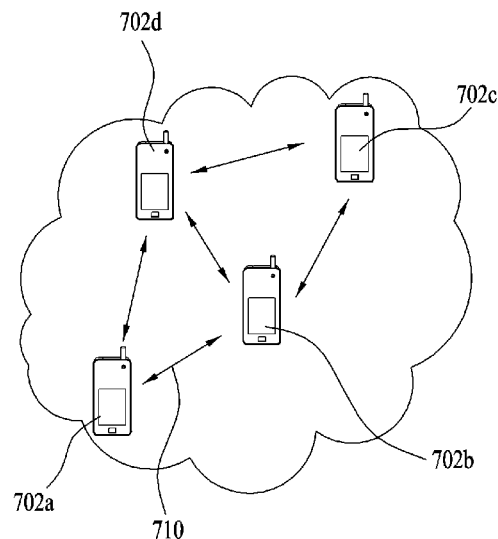
FIG. 7 illustrates a WFD network state when P2P is applied thereto.

FIG. 7 is a diagram for a WFD network aspect in case that P2P is applied.

FIG. 7 shows an example of a WFD network aspect in case of applying a new P2P application (e.g., social chatting, location-based service provision, game interworking and the like). Referring to FIG. 7, a plurality of P2P devices 702a to 702d perform P2P communication 710 in a WFD network. P2P device(s) constructing the WFD network frequently change due to movement of the P2P device or the WFD network itself can be newly generated or disappeared dynamically/in a short time. Hence, characteristic of the new P2P application part is in that P2P communication can be performed and terminated dynamically/in a short time between a plurality of the P2P devices in dense network environment.

Figure 8:
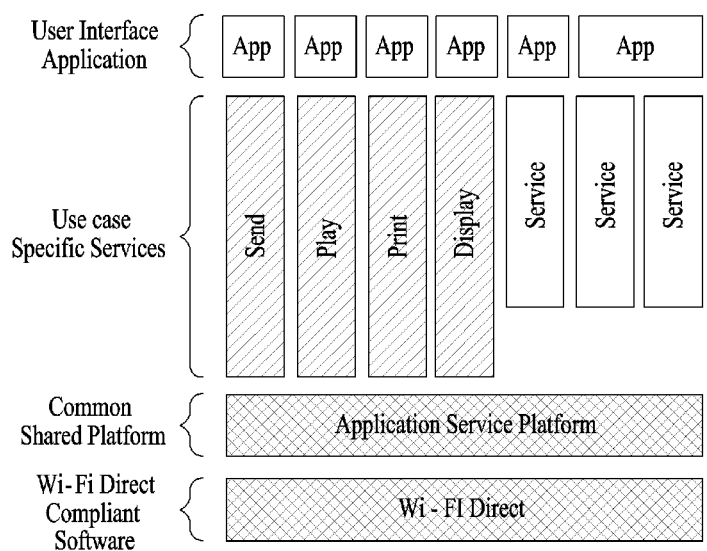
FIG. 8 is a schematic block diagram of a Wi-Fi Direct Services (WFDS) device.

FIG. 8 is a simplified block diagram for a WFDS (Wi-Fi Direct services) device.

A platform for such an application service as an ASP (application service platform) is defined for a Wi-Fi Direct MAC layer and above. The ASP plays a role of session management, command processing of a service, control between ASPs and security between a higher application and a lower Wi-Fi Direct. 4 basic services including a Send service, a Play service, a Display service and a Print service defined by WFDS, a corresponding application and an UI (user interface) are supported at the top of the ASP. In this case, the Send service corresponds to a service capable of performing file transfer between two WFDS devices and an application therefor. The Play service corresponds to a streaming service capable of sharing A/V, a picture, and music based on a DLNA between two WFDS devices and an application therefor. The Print service defines a service capable of outputting a document and a picture between a device including contents such as a document, a picture and the like and a printer and an application therefor. The Display service defines a service enabling screen sharing between Miracast source of WFA and Miracast sink and an application therefor. And, an enablement service is defined for the use of an ASP common platform in case of supporting a third party application except a basic service.

Among terminologies described in the present invention, such a terminology as a service hash is formed from a service name using a first 6 octets of a service hash algorithm (e.g., SHA256 hashing) of a service name A service hash used by the present invention does not mean a specific service hash. Instead, it may be preferable to comprehend the service hash as a sufficient representation of a service name using a probe request/response discovery mechanism. As a simple example, if a service name corresponds to "org.wifi.example", 6 bytes of a forepart of a value of which the service name is hashed by the SHA256 corresponds to a hash value.

In WFDS, if a hash value is included in a probe request message and a service is matched with each other, it may be able to check whether the service is supported in a manner of responding by a probe response message including a service name. In particular, the service name corresponds to a name of a user readable service of a DNS form. A service hash value indicates upper 6 bytes among a value of 256 bytes of the service name generated by an algorithm (e.g., SHA256). As mentioned in the foregoing example, if a service name corresponds to "org.wifi.example", a service hash may correspond to a value of "4e-ce-7e-64-39-49".

Hence, a part of a value of which a service name is hashed by an algorithm is represented as a service hash (information) in the present invention. The service hash can be included in a message as information.

Method of Configuring Legacy WFDS

Figure 9:
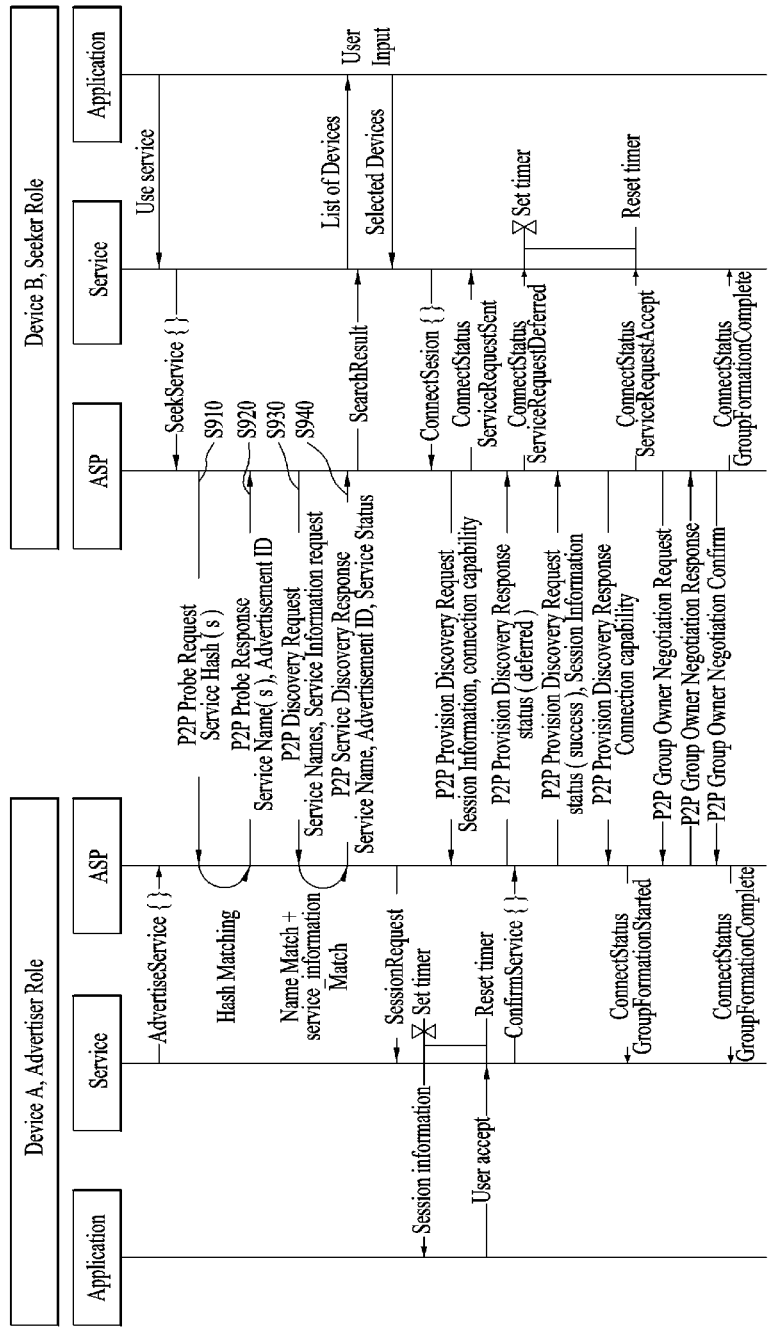
FIG. 9 illustrates a process of performing device discovery and service discovery between WFDS devices to connect a WFDS session in conventional WFDS.

FIG. 9 is a flowchart for a process of establishing a WFDS session by discovering a device and a service between WFDS devices in a legacy WFDS.

For clarity, as shown in FIG. 4, assume that a device A plays a role of an advertiser advertising a WFDS capable of being provided by the device A to a seeker and a device B plays a role in seeking an advertised service. The device A corresponds to a device intending to advertise a service of the device A and a counterpart device intends to start the service in a manner of finding out the service of the device A. The device B performs a procedure of finding out a device supporting a service according to a request of a higher application or a user.

A service end of the device A advertises a WFDS capable of being provided by the service end to an application service platform (ASP) end of the device A. A service end of the device B can also advertise a WFDS capable of being provided by the service end to an ASP end of the device B. In order for the device B to use a WFDS as a seeker, an application end of the device B indicates a service to be used to the service end and the service end indicates the ASP end to find out a target device to use the WI-DS.

In order to find out the target device to use the WFDS, the ASP end of the device B transmits a P2P (peer to peer) probe request message [S910]. In this case, the P2P probe request message includes a service name, which is intended to be found out by the ASP end of the device B or is capable of being supported by the ASP end of the device B, in a service hash form in a manner of hashing the service name. Having received the P2P probe request message from the seeker, if the device A supports the corresponding service, the device A transmits a P2P probe response message to the device B in response to the P2P probe request message [S920]. The P2P probe response message includes a service supported by a service name or a hash value and a corresponding advertise ID value. This procedure corresponds to a device discovery procedure indicating that the device A and the device B are WFDS devices. It is able to know whether a service is supported via the device discovery procedure.

Subsequently, it is able to know a specific service in detail via a P2P service discovery procedure, optionally. The device B, which has found a device capable of performing a WFDS with the device B, transmits a P2P service discovery request message to the device [S930]. Having received the P2P service discovery request message from the device B, the ASP end of the device A transmits a P2P service discovery response message to the device B in a manner of matching the service advertised by the service end of the device A with a P2P service name and a P2P service information received from the device B with each other [S940]. In this case, a GAS protocol defined by IEEE 802.11u is used. As mentioned in the foregoing description, when a request for a service search is completed, the device B can inform an application and a user of a search result. At this point, a group of Wi-Fi Direct is not formed yet. If a user selects a service and the selected service performs a connect session, P2P group formation is performed.

Before the present invention is explained, it is necessary to be cautious of one thing. It is necessary to distinguish a legacy Wi-Fi Direct connection from Wi-Fi Direct service (WFDS) connection described in the present invention. According to the legacy Wi-Fi Direct, it mainly concerns up to a L2 layer, whereas the recently discussed WFDS connection concerns not only the L2 layer but also a higher layer of the L2 layer. In particular, the WFDS connection is dealing with a service session connection performed by an application service platform. Hence, the WI-DS connection may have more diversified and more complex cases compared to the legacy L2 layer connection and it is required to have definition on the cases. In addition, in case of connecting Wi-Fi Direct only between devices and in case of connecting Wi-Fi Direct service between devices, configuration and order of a control frame, which is exchanged via Wi-Fi, may become different.

In this case, for example, among the aforementioned interfaces, the BLE may correspond to a Bluetooth transmission/reception scheme in a form of using a frequency of 2.4 GHz and reducing power consumption. In particular, in order to quickly transmit and receive data of extremely small capacity, it may use the BLE to transmit data while reducing power consumption.

And, for example, the NAN (neighbor awareness networking) network may correspond to NAN devices using a set of the same NAN parameters (e.g., a time period between continuous discovery windows, a period of a discovery window, a beacon interval, a NAN channel, etc.). The NAN devices can configure a NAN cluster. In this case, the NAN cluster uses a set of the same NAN parameters and may correspond to a set of NAN devices synchronized with the same window schedule. A NAN device belonging to the NAN cluster can directly transmit a multicast/unicast NAN service discovery frame to a different NAN device within a range of a discovery window.

And, for example, the NFC may operate on a relatively low frequency band such as 13.56 MHz. In this case, if two P2P devices support the NFC, it may optionally use an NFC channel A seeker P2P device can discover a P2P device using the NFC channel. When an NFC device is discovered, it may indicate that two P2P devices agree on a common channel for forming a group and share provisioning information such as a password of a device.

A method of interworking via an ASP for the aforementioned interfaces is explained in detail in the following. In this case, although the abovementioned configurations are proposed as an interface capable of being interlocked with the ASP, this is an example only. It may support a different interface as well, by which the present invention may be non-limited.

Figure 10:
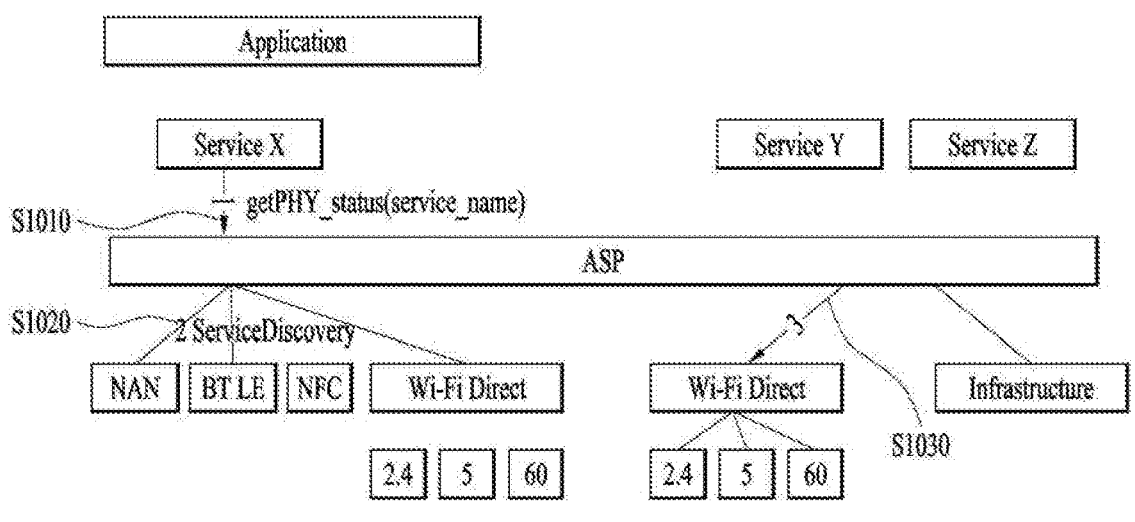
FIG. 10 illustrates a service application platform supporting multiple interfaces.
Figure 10:
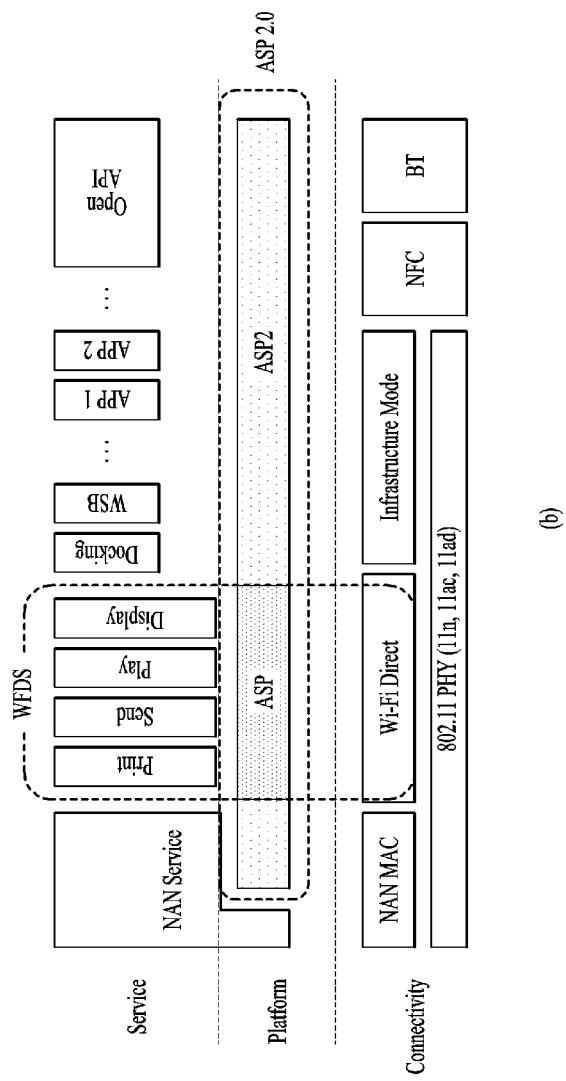

FIG. 10 illustrates an application service platform (ASP) supporting multiple interfaces.

As described above, a service end of an advertiser device as a device supporting WFDS may advertise a service that can be provided by the device, and a service end of a seeker device as another device supporting WFDS may instruct the ASP to seek a device which will use the service. That is, conventional systems can support WFDS between devices through the ASP.

Referring to FIG. 10a, the ASP can support multiple interfaces. For example, the ASP can support multiple interfaces for performing service discovery. In addition, the ASP can support multiple interfaces for performing service connection.

For example, multiple interfaces which perform service discovery may be at least one of Wi-Fi Direct, NAN (Neighbor Awareness Networking), NFC (Near Field Communication), BLE (Bluetooth Low Energy) and WLAN Infrastructure.

In addition, the multiple interfaces which perform service discovery may be at least one of Wi-Fi Direct, P2P and infrastructure. For example, the ASP can support multiple frequency bands. Here, the multiple frequency bands may be 2.4 GHz, 5 GHz and 60 GHz, for example. In addition, the ASP can support information about frequency bands below 1 GHz. That is, the ASP can support multiple frequency bands and the frequency bands are not limited to specific frequency bands.

Referring to FIG. 10a, a first device may perform device discovery or service discovery for a first service using the ASP. Then, when device discovery or service discovery has been sought, the first device may perform service connection on the basis of the seeking result. Here, an interface used to seek service discovery and an interface used for service connection may differ from each other and may be selected from the multiple interfaces.

Accordingly, it may be necessary to define information or parameters for the ASP to support multiple interfaces. Hereinafter, information or parameters for providing services using the ASP supporting multiple interfaces will be described.

With respect to the aforementioned ASP, for example, a service end of a device may acquire information about a service discovery method and a service connection method capable of supporting a first service from the ASP. Here, the first service may be a service provided by the device and is not limited to a specific service.

The service end of the device may call an AdvertiseService( ) or SeekService( ) method from the ASP on the basis of the information acquired from the ASP. That is, the device can use the ASP as an advertiser or a seeker to perform service discovery for the first service, which may be the same as the conventional ASP operation. In addition, the device may perform service connection on the basis of the service discovery result after service discovery for the first service is performed. Here, service connection may be P2P connection or WLAN infrastructure connection. For example, both the service connections support multiple frequency bands and can be performed on the basis of a desired band.

More specifically, referring to FIG. 10a, the service end of the device may call getPHY_status(service_name) method and send a message about a service to be used to the ASP. Here, the service end may receive a return value from the ASP to acquire information on multiple frequency bands with respect to service discovery methods and service connection methods supported by the ASP. Accordingly, the device may notify the ASP of a preferred connection method and a preferred frequency band for the service and acquire information about the service discovery methods and the service connection methods supported by the ASP. The ASP may perform service discovery on the basis of the information received from the service end to seek a specific device and connect the device such that the service can be used.

Here, getPHY_status(service_name) may include information as shown in Table 1, for example. Information shown in right parts of Table 1 is subordinate to information shown at the left of Table 1.

TABLE 1

| Connectivity methods | P2P | Multiband information | 2.4, 5, 60 GHz |
|---|---|---|---|
| | Infrastructure information | BSSID | |
| | | Multiband information | 2.4, 5, Channel Index 60 GHz per band |
| Service Discovery methods | | NAN | |
| | | BTLE | |
| | | NFC | |
| | | Infrastructure | |
| | P2P | Multiband information | 2.4, 5, 60 GHz |

FIG. 10b illustrates a system architecture based on the ASP supporting multiple interfaces.

Referring to FIG. 10b, a service (or service/application) layer, a platform layer and connectivity layer can be configured as layers. Here, the system architecture shown in FIG. 10b may be included in the system architecture in conventional WFDS. For example, "Print", "Send", "Play" and "Display" can be used as services of WFDS. In addition, a NAN service, docking, WSB and other services can be supported in FIG. 10b. That is, various services can be supported in a new system architecture.

Here, the ASP supporting multiple interfaces may be called information about the aforementioned services as a method and may perform connection with other devices using the method. In this case, connection was performed through Wi-Fi Direct in the system architecture in the conventional WFDS. Distinguished from the conventional system architecture, connection with other devices for supporting services can be performed on the basis of NAN MAC, Wi-Fi Direct, infrastructure, NFC, BLE, etc. in the new system architecture of FIG. 10(b).

For example, NAN, Wi-Fi Direct, infrastructure, NFC and BLE can be used for service discovery and device discovery, as described above. In addition, P2P connection and WLAN infrastructure connection, which have been described above, can be used as a connection method. That is, FIG. 10b shows a new system architecture operating on the basis of the ASP supporting multiple interfaces.

Here, P2P connection and WLAN infrastructure connection, for example, can be selectively used as a service connection method. In this case, handover to P2P connection and infrastructure connection may be needed.

For example, P2P connection and WLAN infrastructure connection may use different frequency bands and information. In addition, they may have different service provision qualities due to spatial characteristics or for other reasons. Accordingly, to satisfy specific conditions or provide better services, it is necessary to perform handover from P2P connection to WLAN infrastructure connection. Otherwise, it is necessary to perform handover from WLAN infrastructure connection to P2P connection.

Here, devices need to exchange information necessary to perform seamless handover during a handover process. Hereinafter, a method of exchanging information necessary to perform handover between P2P connection and WLAN infrastructure connection as seamless handover will be described.

Figure 11:
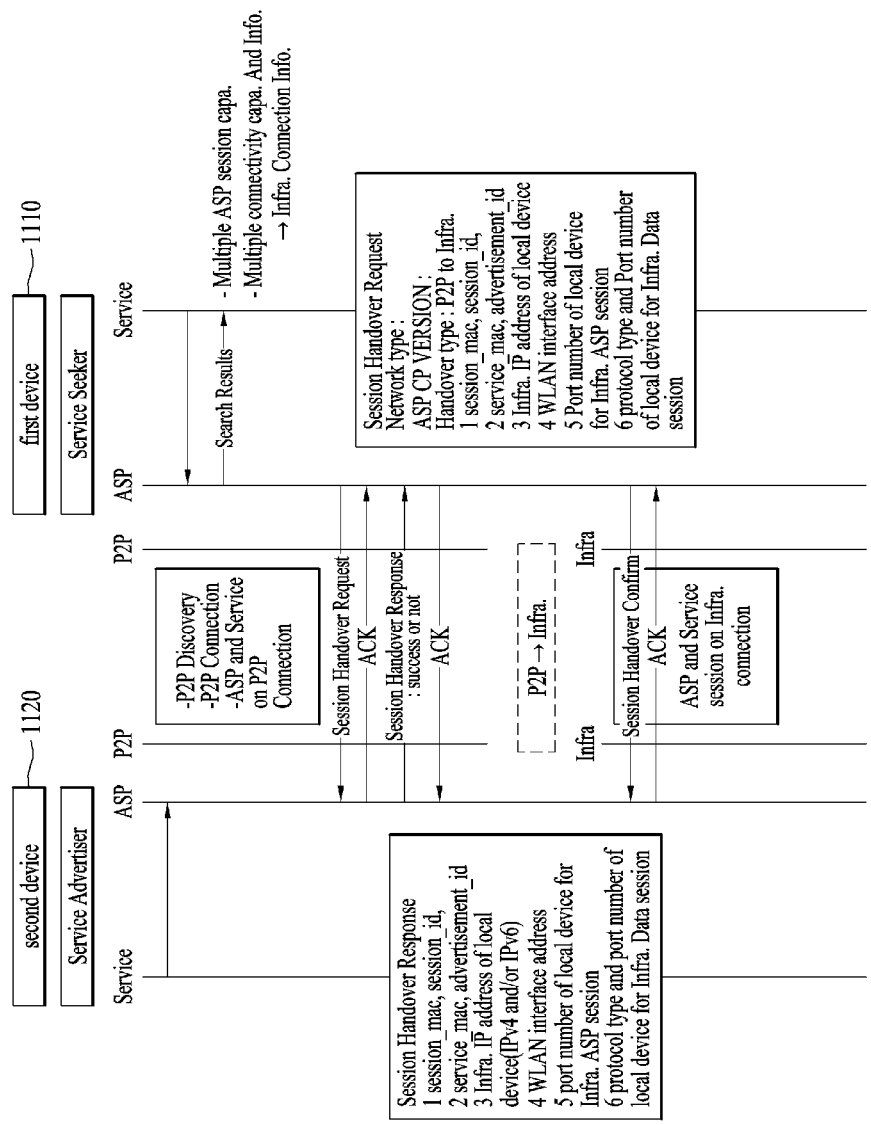
FIG. 11 illustrates a method of performing seamless handover from P2P connection to WLAN infrastructure connection.

FIG. 11 illustrates a method of performing seamless handover from P2P connection to WLAN infrastructure connection.

A first device 1110 and a second device 1120 may perform ASP and service session connection through P2P connection.

Here, the first device 1110 may be a seeker device and the second device 1120 may be an advertise device, for example. Here, the first device 1110 may perform device and service discovery to check whether the second device 1120 supports a service that the first device 1110 intends to use. For example, device and service discovery with respect to the first device 1110 and the second device 1120 may be performed through P2P connection. Alternatively, device and service discovery with respect to the first device 1110 and the second device 1120 may be performed through other interfaces and is not limited to the above-described embodiment.

For example, when the first device 1110 performs device and service discovery to complete discovery with respect to the second device 1120, an ASP end of the first device 1110 may provide information about a search result to a service/application end of the first device 1110. Here, the search result may be an event. That is, the ASP end of the first device 1110 may call the search result event and provide information about the search result to the service/application end of the first device 1110. Accordingly, the first device 1110 can complete discovery with respect to the second device 1120.

Here, the search result event may include information shown in Table 2, for example. That is, the search result event may include information about services and devices such as service names and device names as result information about discovery.

TABLE 2

- The output of search results
  1. Search_id
     A. Returned by the SeekService Method
  2. Service_mac
     A. The remote P2P device address TABLE 2-continued 3. Service_device_name
   A. The WSC-defined name of the remote P2P device
4. Service_name
5. Service_information
6. Service_status
7. Connectivity method
   A. P2P
      i .Band Info
   B. Infra. Structure
      i . Band Info.

Furthermore, the search result event may further include information shown in Table 3, for example.

More specifically, the search result event may further include information on multiple connectivity capabilities. Here, ID information, address information and the like for connection as information about P2P connection may be included as connectivity capability information. In addition, band information about P2P connection may also be included. Furthermore, BSSID information, band/channel information and the like may be included as information about the WLAN infrastructure. In addition, information necessary to perform P2P connection and WLAN infrastructure connection may be further included, and information included in the search result event is not limited to the above-described embodiment.

In addition, information indicating whether multiple ASP sessions can be connected may be included.

TABLE 3

- Multiple connectivity capa.
   o P2P connection info or
      > Connection or not
         : SSID(Service Set Identifier)
         : P2P device address or P2P interface address
   o Infra connection Info
      > BSSID
      > Band/channel(channel list)
   o Multiple ASP session capa When the ASP end of the first device 1110 provides the search result event to the service/application end of the first device 1110, discovery can be completed. Subsequently, the second device 1120 and the first device 1110 can perform connection. For example, the first device 1110 and the second device 1120 can perform connection through P2P connection or WLAN infrastructure, as described above. Thereafter, the first device 1110 and the second device 1120 may perform service session connection to provide a service. FIG. 11 illustrates a case in which the first device 1110 and the second device 1120 perform P2P connection.

Here, the first device 1110 may hand over from P2P connection to WLAN infrastructure connection. In this case, handover can be performed on the basis of spatial situation or quality, as described above. Here, situations in which handover is triggered are not limited in the present invention. In addition, handover may be performed by the second device 1120. For example, one device which intends to perform handover can transmit a session handover request to the other device. Here, both the first device 1110 and the second device 1120 may transmit the session handover request. However, a case in which the first device 1110 transmits the session handover request to the second device 1120 will be described for convenience of description.

For example, the service/application end of the first device 1110 may call a BoundPort method from the ASP end of the first device 1110. Here, the BoundPort method can be composed of at least one of session_mac, sessions_id, ip_address, port and proto shown in Table 4.

More specifically, to maintain an ASP session and a service session between the first device 1110 and the second device 1120, two ports may be needed. In addition, IP addresses or MAC information about sessions or services may be changed when handover is performed. Accordingly, the service/application end of the first device 1110 may call the BoundPort method including the parameters shown in Table 4 from the ASP end of the first device 1110 to check information about new connection. For example, the BoundPort method may be called before the first device 1110 transmits the session handover request to the second device 1120.

For example, when a new connection method is used on the basis of handover, MAC information about sessions or services, which is the same as the previous one, may be used. Accordingly, when the first device 1110 performs handover through a new connection method, for example, the first device 1110 needs to indicate whether previous information is maintained or updated to new information. For example, previous information and updated new information may both be used when the first device 1110 performs handover through the new connection method. Here, the first device 1110 may embed the previous information and the updated new information in a session management message and transmit the session management message to the second device 1120. Accordingly, the first device 1110 and the second device 1120 can share information necessary to maintain a session during handover through the new connection method.

TABLE 4

BoundPort(session_mac, session_id, ip_address, port, proto)

As described above, the first device 1110 may transmit the session handover request to the second device 1120. Subsequently, the first device 1110 may receive ACK from the second device 1120, for example. Then, the first device 1110 may receive a session handover response. Here, the first device 1110 may directly receive the session handover response without receiving ACK from the second device 1120, for example. Thereafter, the first device 1110 may transmit ACK for the session handover response to the second device 1120. When the second device 1120 receives ACK from the first device 1110, handover from P2P connection to WLAN infrastructure connection can be completed.

For example, the first device 1110 may transmit the session handover request to the second device 1120 through P2P connection. That is, the first device 1110 can transmit the session handover request to the second device 1120 through connection used for the current ASP session and service session. Here, the session handover request may include information shown in Table 5, for example. Here, the session handover request may include at least one piece of the information shown in Table 5.

More specifically, the session handover request may include network type, ASP CP VERSION, and handover type information. Session_mac, session_ID, service_mac and advertisement_ID information can be changed in a new connection method and they may be included in the session handover request. In addition, since the handover is handover from P2P connection to WLAN infrastructure connection, the session handover request may include information about the newly connected WLAN infrastructure. That is, the session handover request can include information necessary for handover connection and information necessary for the new connection method.

TABLE 5

- Network type
- ASP CP VERSION
- Handover type
- session_mac, session_id
- service_mac, advertisement_id
- Infra. IP address of the local device
- WLAN device address
- Port number of the local device for Infra. ASP session
- Protocol type and port number of the local device for Infra. Service session In addition, the first device 1110 may receive the session handover response from the second device 1120 through P2P connection. That is, the first device 1110 can receive the session handover response from the second device 1120 through connection used for the current ASP session and service session. For example, the session handover response may include information shown in Table 6. Here, the session handover response may include at least one piece of the information shown in Table 6.

More specifically, the session handover response may include status information indicating whether handover is possible.

For example, when the status information indicates that handover is possible, session_mac, session_ID, service_mac and advertisement_ID information can be included in the session handover response. In the case of handover from P2P connection to WLAN infrastructure connection, the session handover request may include information about the newly connected WLAN infrastructure. That is, the session handover request can include information necessary for handover connection and information necessary for the new connection method.

In addition, when the status information indicates that handover is impossible, information about the reason why handover is impossible may be included in the session handover response. For example, in the case of different ASP CP versions, handover may be impossible and information about this can be included in the session handover response. Further, handover may be impossible in the case of different network types, and information about this may be included in the session handover response. In addition, handover may be impossible for other reasons and information about the reasons may be included in the session handover response.

TABLE 6

- Status : success or not
- If accepted,
  o session_mac, session_id
  o service_mac, advertisement_id
  o Infra. IP address of the local device
  o WLAN device address
  o Port number of the local device for Infra. ASP session
  o Protocol type and port number of the local device for Infra. Service session
- If not accepted, reason
  o Reject from user
  o ASP CP VERSION is different
  o Network type is different
  o Etc•••

Upon reception of the session handover response including information indicating that handover is possible, the first device 1110 can hand over from P2P connection to WLAN infrastructure connection on the basis of the received information. Here, the ASP session and service session with respect to the second device 1120 and the first device 1110 may be performed on the basis of WLAN infrastructure connection. Subsequently, the first device 1110 may transmit Session Handover Confirm to the second device 1120. Here, the first device 1110 may transmit the Session Handover Confirm to the second device 1120 using WLAN infrastructure connection.

For example, the Session Handover Confirm may include information shown in Table 7. More specifically, the Session Handover Confirm may include at least one of status information indicating that handover is completed, session_mac and session_id.

TABLE 7

- Status : confirm
- Information
- session_mac, session_id

Figure 12:
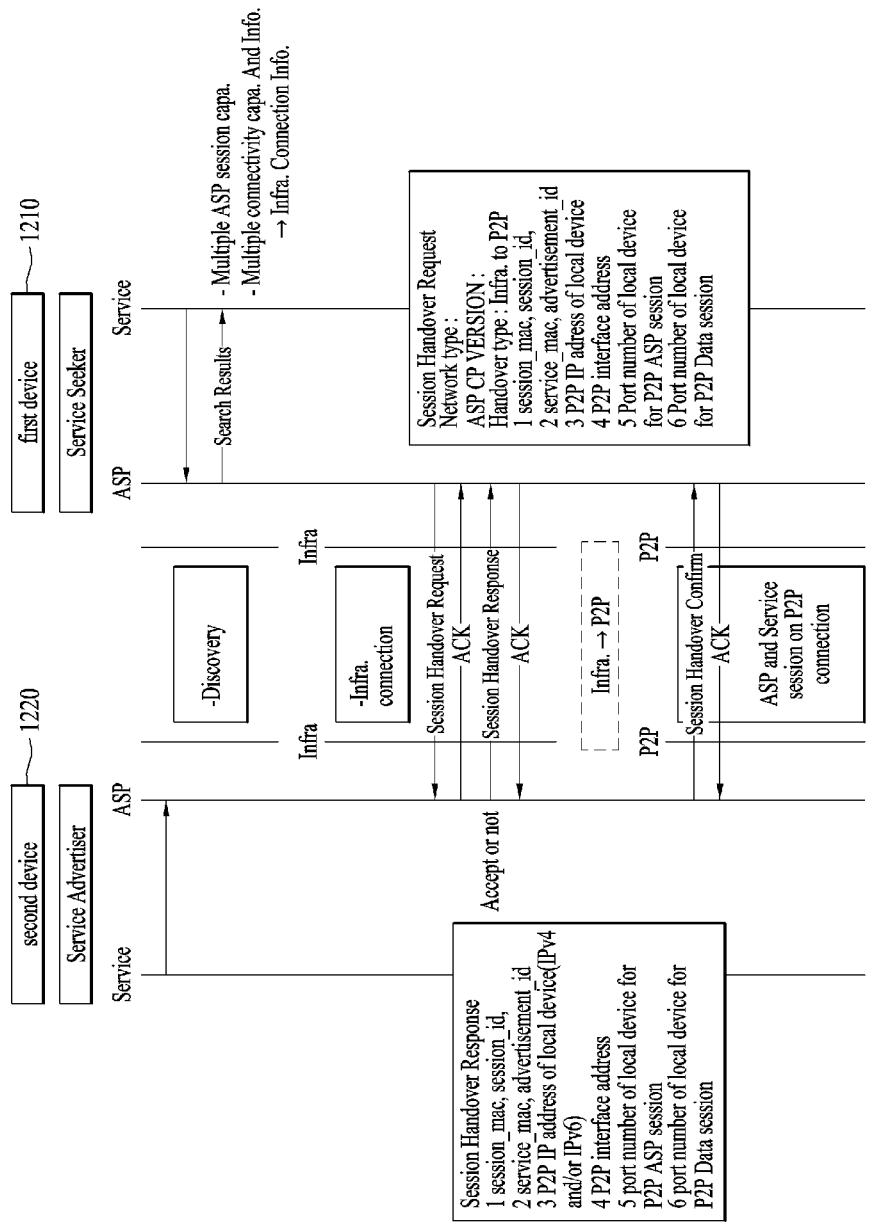
FIG. 12 illustrates a method of performing seamless handover from WLAN infrastructure connection to P2P connection.

FIG. 12 illustrates FIG. 11 illustrates a method of performing seamless handover from WLAN infrastructure connection to P2P connection A first device 1210 and a second device 1220 may perform ASP and service session connection through WLAN infrastructure connection. Here, the method by which the first device 1210 and the second device 1220 perform service and device discovery to achieve connection may be the same as the method in FIG. 11. However, the first device 1210 and the second device 1220 can perform ASP session and service session connection through WLAN infrastructure connection in FIG. 12

Similarly to the method illustrated in FIG. 11, when the first device 1210 performs device and service discovery to complete discovery with respect to the second device 1220, an ASP end of the first device 1210 may provide information about a search result to a service/application end of the first device 1210. Here, the search result may be an event. That is, the ASP end of the first device 1210 may call the search result event and provide information about the search result to the service/application end of the first device 1210. Accordingly, the first device 1210 can complete discovery with respect to the second device 1220. Here, the search result may be as shown in Tables 2 and 3.

Here, the first device 1210 may hand over from WLAN infrastructure connection to P2P connection. In this case, handover can be performed on the basis of spatial situation or quality, as described above. Here, situations in which handover is triggered are not limited in the present invention. In addition, handover may be performed by the second device 1220. For example, one device which intends to perform handover can transmit a session handover request to the other device. Here, both the first device 1210 and the second device 1220 may transmit the session handover request. However, a case in which the first device 1210 transmits the session handover request to the second device 1220 will be described for convenience of description.

For example, the service/application end of the first device 1210 may call the BoundPort method from the ASP end of the first device 1110 as in the method illustrated in FIG. 11 and Table 4.

The first device 1210 may transmit the session handover request to the second device 1220. Subsequently, the first device 1210 may receive ACK from the second device 1220, for example. Then, the first device 1210 may receive a session handover response. Here, the first device 1210 may directly receive the session handover response without receiving ACK from the second device 1220, for example. Thereafter, the first device 1210 may transmit ACK for the session handover response to the second device 1220. When the second device 1220 receives ACK from the first device 1210, handover from WLAN infrastructure connection to P2P connection can be completed.

For example, the first device 1210 may transmit the session handover request to the second device 1220 through WLAN infrastructure connection. That is, the first device 1210 can transmit the session handover request to the second device 1220 through connection used for the current ASP session and service session. Here, the session handover request may include information shown in Table 8, for example. Here, the session handover request may include at least one piece of the information shown in Table 8.

More specifically, the session handover request may include network type, ASP CP VERSION, and handover type information. Session_mac, session_ID, service_mac and advertisement_ID information can be changed in a new connection method and may be included in the session handover request. In addition, since the handover is handover from WLAN infrastructure connection to P2P connection, the session handover request may include information about P2P connection. That is, the session handover request can include information necessary for handover connection and information necessary for the new connection method.

TABLE 8

- Network type
- ASP CP VERSION
- Handover type
- session_mac, session_id
- service_mac, advertisement_id
- P2P IP address of the local device
- P2P interface address
- P2P operating band/channel
- Port number of the local device for Infra. ASP session
- Protocol type and port number of the local device for Infra. Service sessionInfra. IP address of the local device In addition, the first device 1210 may receive the session handover response from the second device 1220 through WLAN infrastructure connection. That is, the first device 1210 can receive the session handover response from the second device 1220 through connection used for the current ASP session and service session. For example, the session handover response may include information shown in Table 9. Here, the session handover response may include at least one piece of the information shown in Table 9.

More specifically, the session handover response may include status information indicating whether handover is possible.

For example, when the status information indicates that handover is possible, session_mac, session_ID, service_mac and advertisement_ID information can be included in the session handover response. In the case of handover from WLAN infrastructure connection to P2P connection, the session handover request may include information about new P2P connection. That is, the session handover request can include information necessary for handover connection and information necessary for the new connection method.

In addition, when the status information indicates that handover is impossible, information about the reason why handover is impossible may be included in the session handover response. For example, in the case of different ASP CP versions, handover may be impossible and information about this can be included in the session handover response. Further, handover may be impossible in the case of different network types, and information about this may be included in the session handover response. In addition, handover may be impossible for other reasons and information about the reasons may be included in the session handover response.

TABLE 9

- Status : success or not
- If accepted,
    ○ session_mac, session_id
    ○ service_mac, advertisement_id
    ○ P2P IP address of the local device
    ○ P2P interface address
    ○ P2P operating band/channel
    ○ Port number of the local device for Infra. ASP session
    ○ Protocol type and port number of the local device for Infra. Service session
- If not accepted, reason
    ○ Reject from user
    ○ ASP CP VERSION is different
    ○ Network type is different
    ○ Etc•••

Upon reception of the session handover response including information indicating that handover is possible, the first device 1210 can hand over from WLAN infrastructure connection to P2P connection on the basis of the received information. Here, the ASP session and service session with respect to the second device 1220 and the first device 1210 may be performed on the basis of P2P connection. Subsequently, the first device 1210 may transmit Session Handover Confirm to the second device 1220. Here, the first device 1210 may transmit the Session Handover Confirm to the second device 1220 using P2P connection.

For example, the Session Handover Confirm may include information shown in Table 10. More specifically, the Session Handover Confirm may include at least one of status information indicating that handover is completed, session_mac and sessions_Id.

TABLE 10

- Status : confirm
- Information
- session_mac, session_id

For example, the session handover request, session handover response and Session Handover Confirm messages may take the form of an ASP coordination protocol (CP) message. That is, the second device 1220 and the first device 1210 exchange the aforementioned messages when the ASP session and the service session are established, and the messages can be configured in the form of the ASP CP message.

For example, the session handover request, session handover response and Session Handover Confirm messages may be defined as ASP CP messages. Here, Tables 11 and 12 show normal message formats of the ASP CP message. For example, the session handover request, session handover response and Session Handover Confirm messages may be defined using reserved bits of Opcode and used. That is, fields indicating the session handover request, session handover response and Session Handover Confirm messages may be set to the reserved bits of Opcode. Here, the information shown in Table 8 (session handover request), Table 9 (session handover response) and Table 10 (Session Handover Confirm) may be included in a payload field. The message types described below may be an embodiment and are not limited to the aforementioned embodiment.

TABLE 11

| Field | Size (octets) | Value | Description |
|---|---|---|---|
| Opcode | 1 | See Table 12 | Opcode for each message type is listed in Table 12 |
| Sequence Number | 1 | | Sequence Number is incremented by 1 when the device sends each new message. |
| Payload | variable | | Each message type defines a payload format. |

TABLE 12

| Opcode | Message |
|---|---|
| 0 | REQUEST_SESSION |
| 1 | ADDED_SESSION |
| 2 | REJECTED_SESSION |
| 3 | REMOVE_SESSION |
| 4 | ALLOWED_PORT |
| 5 | VERSION |
| 6 | DEFERRED_SESSION |
| 7-253 | Reserved |
| 254 | ACK |
| 255 | NACK |

Figure 13:
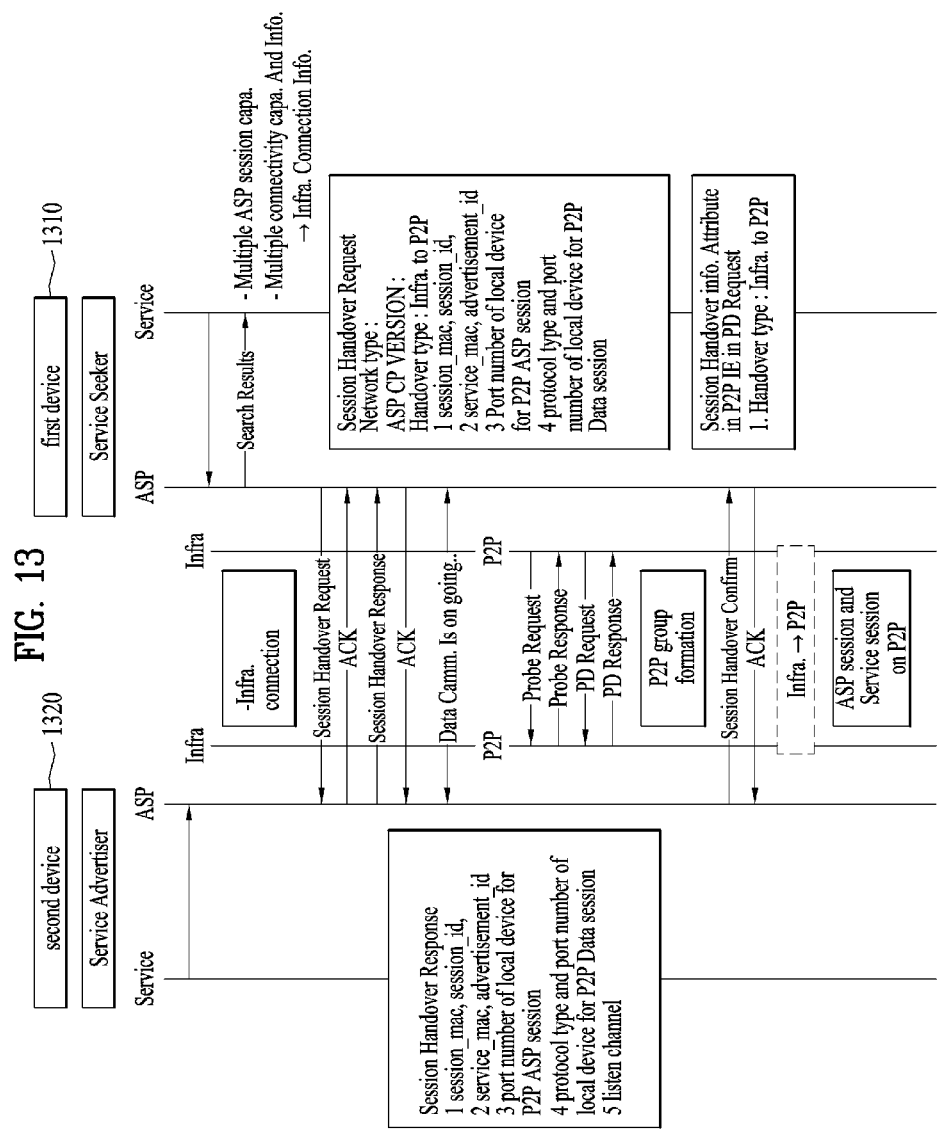
FIG. 13 illustrates a case in which seamless handover from WLAN infrastructure connection to P2P connection is performed when P2P connection is not established.

FIG. 13 illustrates a case in which seamless handover from WLAN infrastructure connection to P2P connection is performed when P2P connection is not established.

When seamless handover from WLAN infrastructure connection to P2P connection is performed, P2P connection may need to be newly established. This may correspond to a case in which P2P connection is initially attempted when a first device 1310 and a second device 1320 hand over from WLAN infrastructure connection to P2P connection, for example. In this case, a procedure for P2P connection can be performed after the first device 1310 receives the aforementioned Session Handover Confirm from the second device 1320.

More specifically, the first device 1310 may transmit the Session Handover Confirm to the second device 1320 and then send a probe request to the second device 1320. Thereafter, the first device 1310 may receive a probe response from the second device 1320. Here, the second device 1320 and the first device 1310 have performed device and service discovery in the process of establishing WLAN infrastructure connection, and thus exchange of the probe request/response may be omitted. Subsequently, the first device 1310 may transmit a provision discovery request to the second device 1320. Then, the first device 1310 may receive a provision discovery response from the second device 1320. Here, the purpose of performing P2P connection may be to perform session handover from WLAN infrastructure connection to P2P connection. That is, P2P connection can be performed for session handover. In this case, the first device 1310 may provide information indicating that P2P connection is performed for session handover to the second device 1320, for example. The information indicating session handover may be included in the aforementioned provision discovery request. That is, the first device 1310 can transmit the provision discovery request including the information indicating that P2P connection is performed for session handover to the second device 1320.

For example, the information indicating session handover may be included as attribute information. More specifically, attribute fields included in the provision discovery request and response may be as shown in Table 13. Table 13 shows attribute information defined in the existing provision discovery request and response.

TABLE 13

| Attribute ID | Attribute | Provision Discovery Request | Provision Discovery Response |
|---|---|---|---|
| 2 | P2P Capability | Always Present | Always Present |
| 13 | PSP Device Info | Always Present | Always Present |
| 15 | P2P Group ID | Present if the value of the Connection Capability Info attribute Indicates New or GO or (New, GO) or (CII, GO) | Present if the value of the Connection Capability Info attribute indicates GO |
| 9 | Intended P2P Interface Address | Present if the value of the Connection Capability Info attribute indicates New or GO or (New, GO) or (CII, GO), or the Persistent Group Info attribute is present and the requester is the GO of the persistent group. | Present if the value of the Connection Capability Info attribute indicates GO, or the Persistent Group Info attribute is present and the responder is the GO of the persistent group. |
| 0 | Status | — | Always Present |
| 17 | Operating Channel | Present if the value of the Connection Capability Info attribute indicates New or GO or (New, GO) or (CII, GO), or the Persistent Group Info attribute is included and the requester is the Group Owner of the persistent group. | Present if the value of the Connection Capability Info attribute indicates GO, or the Persistent Group Info attribute is included and the responder is the Group Owner of the persistent group. |
| 11 | Channel List | Present if the value of the Connection Capability Info attribute indicates New or (New, GO) or CII or (Go, CII), or the Persistent Group Info attribute is included. | Present if the value of the Connection Capability Info attribute indicates CII or GO, or the Persistent Group Info attribute is included. |
| 22 | Session Information Data Info | Present only if the length of the value in the session_information attribute is not 0. | May be presented if the value of the Status attribute is "Fail; information is currently unavailable" |

TABLE 13-continued

| Attribute ID | Attribute | Provision Discovery Request | Provision Discovery Response |
|---|---|---|---|
| 23 | Connection Capability Info | Always Present | Present in the Provision Discovery Response frame if the value of the Status attribute is "Success" and the Persistent Group Info attribute is not included. |
| 24 | Advertisement ID Info | Always Present | Is set to the value of the Advertisement ID Info attribute included in the corresponding Provision Discovery Request frame. |
| 5 | Configuration Timeout | Present if the value of the Connection Capability Info attribute indicates New or (New, GO) or (GO, CII), or the Persistent Group Info attribute is included | Present if the value of the Connection Capability Info attribute indicates GO or CII, or the Persistent Group Info attribute is included in the frame. |
| 6 | Listen Channel | Present if the value of the Connection Capability Info attribute indicates New or CII | — |
| 26 | Session ID Info | Always Present | Always Present |
| 27 | Feature Capability | Always Present | Always Present |
| 28 | Persistent Group Info | Present if the persistent group is available and the ASP intends to use it | Present if the value of the Status attribute is Success, the persistent group is known, and the ASP intends to use it. |

Here, "Session Handover Info" can be added as the aforementioned attribute field. That is, it is possible to indicate that P2P connection for session handover is performed through a "Session Handover Info" attribute field.

For example, the "Session Handover Info" attribute field may be as shown in Table 14. More specifically, the "Session Handover Info" attribute field may be defined in the provision discovery request. Here, the "Session Handover Info" attribute field can indicate information about a handover type. That is, the "Session Handover Info" attribute field can indicate information about session handover from WLAN infrastructure connection to P2P connection or session handover from P2P connection to WLAN infrastructure connection.

Accordingly, the second device 1320 can confirm that P2P connection is performed for session handover.

TABLE 14

- Session Handover Info. Attribute
   o Handover type :
      > Infra. to P2P
      > P2P to Infra.
      > Etc..

As another example, even when the first device 1310 and the second device 1320 initially perform P2P connection, they may not perform P2P connection. In this case, the first device 1310 and the second device 1320 may exchange advance information for P2P connection in the WLAN infrastructure connection.

That is, information handled in the process of exchanging the provision discovery request and the provision discovery response may be exchanged in the WLAN infrastructure connection state. For example, at least one piece of band/channel (listen channel) and timing related information may be signaled for communication through P2P connection in WLAN infrastructure connection. In addition, information necessary for P2P connection may be exchanged in advance in WLAN infrastructure connection. Then, the first device 1310 may perform P2P connection and transmit Session Handover Confirm to the second device 1320.

Figure 14:
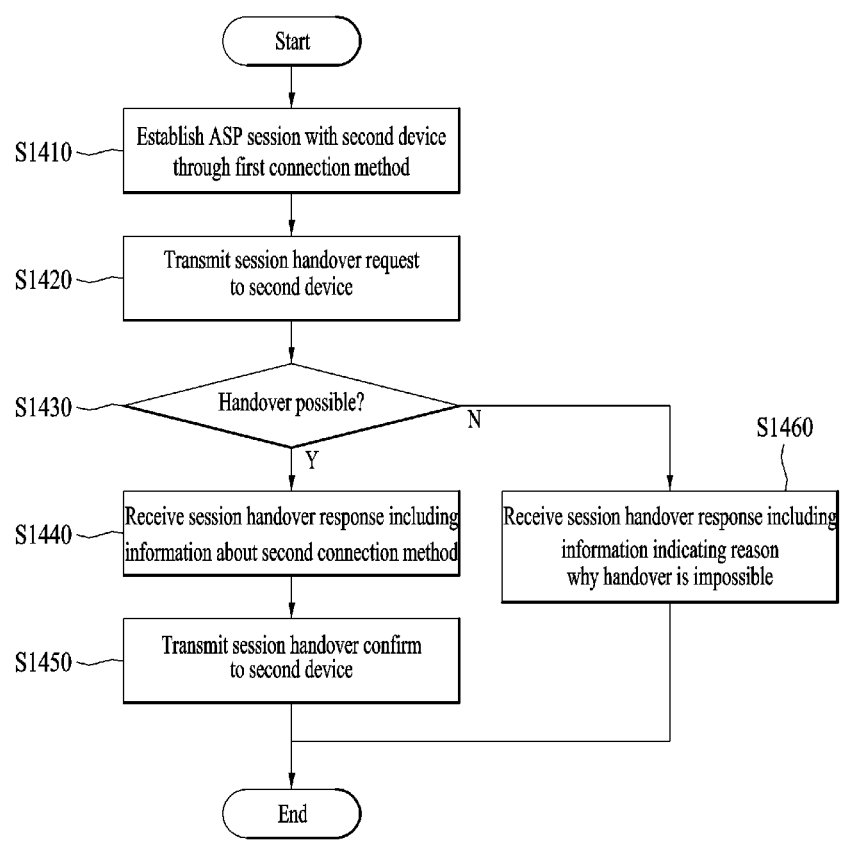
FIG. 14 is a flowchart illustrating a method of performing session handover according to an embodiment of the specification.

FIG. 14 is a flowchart illustrating a method by which a device performs session handover according to an embodiment of the present invention.

A first device may establish an ASP session with a second device through a first connection method (S1410). Here, the first connection method may be one of P2P connection and WLAN infrastructure connection as described above with reference to FIGS. 10 to 13. That is, the first device and the second device can establish the ASP session using one of P2P connection and WLAN infrastructure connection. For example, a session for a service may be established on the basis of the ASP session. For example, the ASP can support multiple interfaces, as describe above with reference to FIGS. 10 to 13.

Subsequently, the first device may transmit a session handover request to the second device (S1420). Here, the session handover request may include session MAC, session ID, service MAC and service ID information, as described above with reference to FIGS. 10 to 13. That is, the session handover request may include information about the session and the service. In addition, the session handover request may include information about a second connection method, for example. Here, the second connection method may be WLAN infrastructure connection when the first connection method is P2P connection and may be P2P connection when the first connection method is WLAN infrastructure connection. That is, the ASP can support P2P connection and WLAN infrastructure connection as connection methods, and ASP session connection can be achieved through one of the connection methods. Here, the session handover request can be transmitted when handover is performed through a different connection method from the connection method for the established ASP session.

Subsequently, the second device may determine whether handover is possible (S1430). Here, a session handover response may include information indicating whether handover is possible, as described above with reference to FIGS. 10 to 13. When the information indicates that handover is possible, the session handover response may include information about the second connection method (S1440). That is, the first device may receive the session handover response including information about a new connection method in response to the session handover request. Subsequently, the first device 1310 may transmit Session Handover Confirm to the second device (S1450). Here, when the first device receives the session handover response, the connection method for the established ASP session may be changed from the first connection method to the second connection method, as described above with reference to FIGS. 10 to 13. That is, the ASP session can be handed over from the first connection method to the second connection method. Then, the first device may transmit Session Handover Confirm indicating that ASP session handover is completed to the second device. For example, Session Handover Confirm may be transmitted to the second device through the newly set second connection method as described above.

On the other hand, when the information indicates that handover is impossible, the session handover response may include information about the reason why handover is impossible (S1460). That is, when handover is impossible, the first device can recognize the reason why handover is impossible using the information included in the Session Handover response.

Figure 15:
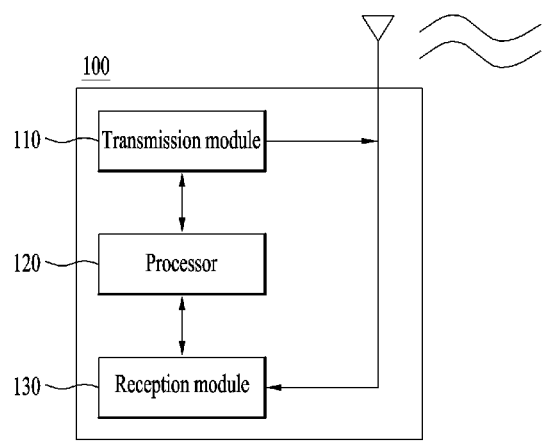
FIG. 15 is a block diagram of a device according to an embodiment of the present invention.

FIG. 15 is a block diagram of a device according to an embodiment of the present invention.

The device may be a device capable of supporting multiple interfaces. Here, the device 100 may include a transmission module 110 which transmits radio signals, a reception module 130 which receives radio signals, and a processor 120 which controls the transmission module 110 and the reception module 130. The device 100 may perform communication with an external device using the transmission module 110 and the reception module 130. Here, the external device may be another device. For example, the external device may be another device connected through P2P, or an AP or a non-AP connected through WLAN infrastructure. Alternatively, the external device may be a base station. That is, the external device may be a device which can perform communication with the device 100 and is not limited to the above-described embodiments. The device 100 may transmit and receive digital data such as content using the transmission module 110 and the reception module 130.

According to an embodiment of the present invention, the processor 120 of the device 100 may establish an ASP session with a second device through a first connection method. Here, the processor 120 may transmit a session handover request to the second device using the transmission module 110. Then, the processor 120 may receive a session handover response from the second device using the reception module 130. Subsequently, the processor 120 may transmit Session Handover Confirm to the second device using the transmission module 110. Here, when the session handover response is received from the second device, the established ASP session may be handed over through a second connection method as described above.

The embodiments of the present invention may be achieved by various means, for example, hardware, firmware, software, or a combination thereof.

In a hardware configuration, the methods according to the embodiments of the present invention may be achieved by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors, etc.

In a firmware or software configuration, the embodiments of the present invention may be implemented in the form of a module, a procedure, a function, etc. Software code may be stored in a memory unit and executed by a processor. The memory unit may be located at the interior or exterior of the processor and may transmit data to and receive data from the processor via various known means.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

Both a product invention and a process invention are described in the specification and the description of both inventions may be supplementarily applied as needed.

INDUSTRIAL APPLICABILITY

Although methods by which a device performs discovery in a wireless communication system has been described above on the basis of examples in which the methods are applied to a NAN system, the methods can be applied to various wireless communication systems in addition to the NAN system.

The invention claimed is:

1. A method for performing session handover by a first device in a wireless communication system, the method comprising:
    establishing an application service platform (ASP) session with a second device through a first connection method;
    transmitting, to the second device, a session handover request message;
    receiving, from the second device, a session handover response message,
    wherein the session handover request message and the session handover response message are exchanged based on the first connection method, and
    wherein when the session handover response message is received from the second device, the established ASP session is handed over through a second connection method,
    transmitting, to the second device, a session handover confirm message based on the second connection method,
    wherein the first connection method is different from the second connection method, and
    wherein each of the first and the second connection method is one of a peer-to-peer (P2P) connection method and a WLAN infrastructure connection method.

2. The method according to claim 1, wherein the session handover request message includes first information related to the established ASP session and services supported based on the established ASP session.

3. The method according to claim 2, wherein the session handover request message further includes second information related to the second connection method.

4. The method according to claim 1, wherein the session handover response message includes third information on whether a session handover from the first connection method to the second connection method is possible.

5. The method according to claim 4, wherein the session handover response message further includes second information related to the second connection method when the third information specifies that the session handover is possible.

6. The method according to claim 4, wherein when the third information specifies that the session handover is impossible, the session handover response message further includes fourth information related to a reason for the impossible session handover.

7. The method according to claim 1, wherein the ASP session is established based on one of the first connection method and the second connection method.

8. The method according to claim 1, further comprising:
performing connection through the second connection method after reception of the session handover response message from the second device.

9. The method according to claim 1, wherein the session handover request message, the session handover response message and the session handover confirm message are configured in a form of ASP coordination protocol (CP) message, based on reserved bits of Opcode.

10. The method according to claim 9, wherein the session handover request message, the session handover response message and the session handover confirm message are exchanged based on the established ASP session.

11. A first device performing session handover in a wireless communication system, the first device comprising:
a receiver;
a transmitter; and
a processor, operatively coupled to the receiver and transmitter,
wherein the processor is configured to:
establish an application service platform (ASP) session with a second device through a first connection method;
control the transmitter to transmit, to the second device, a session handover request message;
control the receiver to receive, from the second device, a session handover response message,
wherein the session handover request message and the session handover response message are exchanged based on the first connection method, and
wherein when the session handover response message is received from the second device, the established ASP session is handed over through a second connection method,
control the transmitter to transmit, to the second device, a session handover confirm message based on the second connection method,
wherein the first connection method is different from the second connection method, and
wherein each of the first and the second connection method is one of a peer-to-peer (P2P) connection method and a WLAN infrastructure connection method.

12. The first device according to claim 11, wherein the session handover request message includes first information related to the established ASP session and services supported based on the established ASP session, and second information related to the second connection method.

* * * * *